United States Patent
Makishima

[11] Patent Number: 5,181,689
[45] Date of Patent: Jan. 26, 1993

[54] PIPE JOINT APPARATUS
[75] Inventor: Reichi Makishima, Tokyo, Japan
[73] Assignee: Nitto Kohki Co., Ltd., Tokyo, Japan
[21] Appl. No.: 791,282
[22] Filed: Nov. 13, 1991
[30] Foreign Application Priority Data
Nov. 20, 1990 [JP] Japan .................. 2-121391
[51] Int. Cl.⁵ .................. F16L 29/00; F16L 27/12
[52] U.S. Cl. .................. 251/149.6; 137/614.04; 285/165
[58] Field of Search .............. 137/614.04, 614, 614.03, 137/614.05, 614.02; 285/166, 167, 168, 165; 251/149, 149.1, 149.6

[56] References Cited
U.S. PATENT DOCUMENTS

| | | | |
|---|---|---|---|
| 2,955,850 | 10/1960 | Bellinger | 285/166 X |
| 3,645,294 | 2/1972 | Allread | 137/614.04 X |
| 4,154,551 | 5/1979 | Petrie | 285/166 X |
| 4,188,050 | 2/9180 | Lochte | 285/166 X |
| 4,482,171 | 11/1984 | Campell | 284/166 X |

FOREIGN PATENT DOCUMENTS
679767 8/1979 U.S.S.R. .................. 285/166

Primary Examiner—Martin P. Schwadron
Assistant Examiner—Kevin L. Lee
Attorney, Agent, or Firm—Nixon & Vanderhye

[57] ABSTRACT

The present invention provides a pipe joint apparatus comprising a front cylindrical member arranged on the side of a connecting section for connecting to a second joint member in a first joint means, and connected to the second joint member; a back cylindrical member arranged in the first joint member to be spaced from the front cylindrical member and to be opposite to the front cylindrical member, and connected to the pipe; and a sleeve having both end portions coupled to outer peripheral surfaces of both front and back cylindrical members through the respective spherical rotation portion, and forming a fluid passage enclosing the outer peripheral surfaces of the front and back cylindrical members.

5 Claims, 1 Drawing Sheet

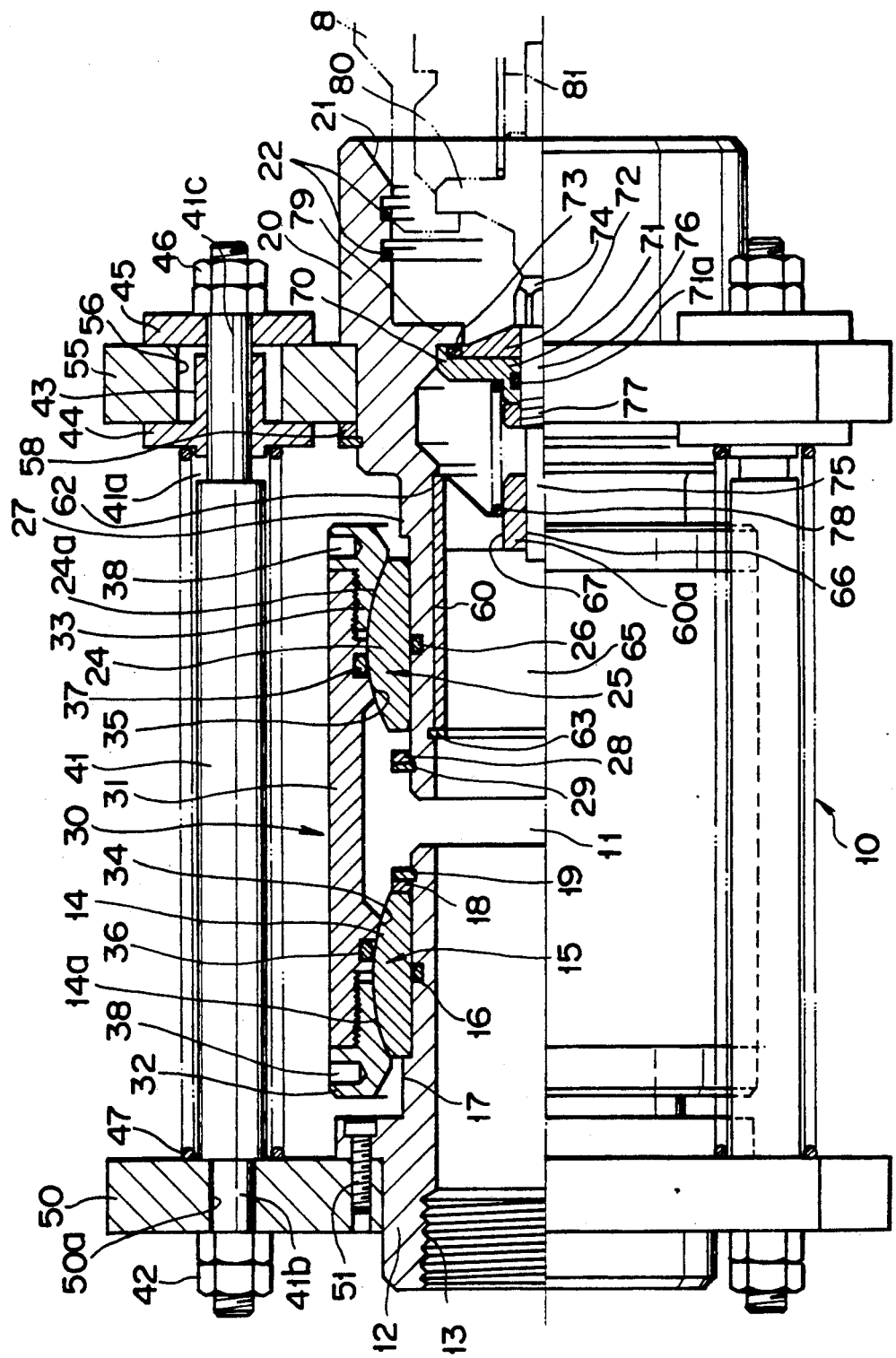

PIPE JOINT APPARATUS

BACKGROUND OF THE INVENTION

1. Field of the Invention

The present invention relates to a pipe joint apparatus, which can absorb eccentric state between a pair of pipes and couple joint members.

2. Description of the Related Art

Conventionally, there is known a pipe joint having a pair of joint members comprising a socket and a plug. As a pipe joint, there is often used the arrangement in which one joint member is coupled to a fixing pipe fixed to a wall surface and the other joint member, which is connected to the pipe on a non-fixing side, is inserted into the joint member.

This arrangement can be similarly used in a case in which a pipe joint having a large diameter is used in the connection of pipes having a large diameter. For example, as one example, there is disclosed a pipe joint for coupling pipes having a large diameter in Published Examined Japanese Utility Model Application No. 1-42711. The joint member on the fixing side is supported by a support member movable in a radial direction. A flange, which is provided in an outer peripheral surface portion of the joint member, and the support member are coupled to each other by a support rod through a pair of spherical pairs, which are back and forth, and a spring. Also, there is shown the structure in which the other joint member is spherical in a form of a spherical joint.

According to the above well-known pipe joint, even if mutual axes of both joint members to be coupled are slightly shifted, the shift is corrected by the joint member on the fixing side, so that both axes can be consistent with each other. Due to this, both joint members are completely coupled to each other, thereby making possible to prevent leakage of fluid and breakage of the joint members.

However, in the well-known technique, the collar portion is provided in the outer peripheral portion of the joint member and the collar portion is used to be coupled to the support member. Due to this, there is a problem in that the pipe joint having a large diameter is further large sized. Also, according to the well-known technique, when the axes of both joint members to be coupled is slightly shifted or crossed at a small angle, the shift can be relatively easily corrected. However, if the shift of both axes of these joint members is enlarged or the crossed axes angle is enlarged, there is a problem that the joint becomes difficult to be performed. Also, in a case where a plurality of the pipe joints, whose joint position is shifted in the direction of the axis, is connected at the same time, it is necessary to adjust the deflection in the direction of the axis at the time of joint. However, in the well-known technique, there is a problem in that such an adjustment can not be performed.

SUMMARY OF THE INVENTION

The present invention has been made to solve the above-mentioned problems. An object of the invention is to provide a small-sized pipe joint, which is suitable for a pipe joint having a large diameter, wherein both joint members can be easily coupled even if the axes of both joint members to be coupled are largely shifted.

Also, another object of the present invention is to provide a small-sized pipe joint, which is suitable for a multi-pipe, wherein if the axes of both joint members is shifted in not only a radial direction but also the direction of the axis, these deflection can be easily absorbed.

In order to attain the above objects, according to the present invention, in a pipe joint using a socket and a plug as a pair of joint members, one joint member comprises a front cylindrical member to be connected to the other joint member and a back cylindrical member to be connected to a fixing pipe. Mutual outer peripheral surfaces of these cylindrical members are coupled to each other to be aligned through a sleeve by a spherical rotation portion, so that there can be formed a fluid passage enclosing the outer peripheral surfaces of both cylindrical members with the sleeve and the spherical rotation portion. Thereby, the above-mentioned problem can be solved. Also, according to the above-mentioned pipe joint, the front and back cylindrical members are supported by front and back support plates, which are opposed to each other. Then, at least one cylindrical member is formed to be movable in the direction the axis in the spherical rotation portion, and to be freely deflected in the radial direction by a coupling shaft coupling the support plates. Thereby, the above-mentioned problem can be solved.

Therefore, according to the present invention, in a case where the axis of one joint member and that of the other joint member are shifted, force is applied to the front cylindrical member in a direction conforming to the direction of the axis of the other joint member from a radial direction between both the front and back cylindrical members, which are integrally connected to each other by the sleeve and the spherical rotation portion if both members are started to be connected. Thereby, the front cylindrical member rotates against the axis through the spherical rotation member. At this time, the back cylindrical member is set to be crossed the axis of the front cylindrical member without changing the direction of the back cylindrical member, and the axis of the front cylindrical member and the axis of the other joint member are aligned and both members are connected.

In a case where a plurality of pipe joints are arranged and the positions of both joint members are shifted in the axial direction every pipe joint, the insertion of the joint member, which is the closest to the front cylindrical member, is started. Sequentially, if the insertion of the joint member of the other pipe joint is started, the front cylindrical member of the joint member, which is paired with the preceding joint member, retreats against elastic force of a spring and its position is controlled. Thereafter, all joint members are sequentially connected to each other, and all pipe joints are completely connected in the end.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWING

The accompanying drawing, which is incorporated in and constitutes a part of the specification, illustrates a presently preferred embodiment of the invention and, together with the general description given above and the detailed description of the preferred embodiment given below, serves to explain the principles of the invention.

A drawing is a side view showing an upper portion of a first embodiment of the pipe joint of the present invention in its vertical cross portion.

DETAILED DESCRIPTION OF THE PREFERRED EMBODIMENT

Embodiment of the present invention will be explained with reference to the drawing.

In the explanation, one joint member is a socket 10, and the other joint member is a plug 8. Sides, which are connected to the plug 8 of the socket 10 are expressed as a front portion, a front surface, a forward portion and a front end portion, and sides, which are connected to the pipe on the side of the socket, are a back portion, a back surface, a backward portion, and a back end portion.

The socket 10 comprises a back cylindrical member 12 having a female screw 13 for connection to a fixing pipe in an inner peripheral surface of the back portion, a front cylindrical member 20 having a tapered surface 21 guiding the plug 8 to the inner periphery surface of the front end portion, and a cylindrical sleeve 30 coupling the front cylindrical member 20 to the back cylindrical member 12 by conforming the axis. Moreover, there are formed a spherical rotation portions 15 and 25 to be explained later among the front and back cylindrical members 20, 12 and the sleeve 30.

A ring-shaped coupling ball 14 is inserted into the outer peripheral surface of the front portion of the back cylindrical member 12. On the outer periphery surface, there is formed a convex circular surface 14a, whose central portion expands in a centrifugal direction. An O-ring 16 is provided between the coupling ball 14 and the outer peripheral surface of the back cylindrical member 12. Moreover, the coupling ball 14 is sandwiched by a stepped portion 17, which is formed in the central portion of the back cylindrical member 12, a buffer washer 18, which is inserted into the outer peripheral surface of the front end portion of the back cylindrical member 12, and a stop ring 19, thereby movement to the axial direction is restricted. The convex circular surface 14a of the ball 14 is formed in the inner peripheral surface of the sleeve 30 and evenly comes in surface-contact with a concave circular surface 34, thereby forming the spherical rotation portion 15.

Furthermore, in the outer peripheral surface of the back end portion of the front cylindrical member 20, there are formed the spherical rotation portion 25 having the same structure as that of the spherical rotation portion 15 of the back cylindrical member 12. In this case, the front cylindrical member 20 is supported to be slightly movable to the axial direction against a coupling ball 24. Reference numeral 27 is a stepped portion, which is detachable from the front end surface of the ball 24, reference numeral 28 is a buffer washer, which is detachable from the back end surface of the ball 24, and reference numeral 29 is a stop ring.

In the sleeve 30, there is provided a main cylinder 31. In the front end portion of the main cylinder 31 and the inner peripheral surface of the back end portion, auxiliary rings 32 and 33 having the same diameter as that of the main cylinder 31 are screwed to be integrated with each other. Moreover, on the front and back portions of the inner peripheral surface of the sleeve 30, there are formed concave circular surfaces 34 and 35 which comes in surface-contact with the convex circular surfaces 14a, 24a of the coupling balls 14 and 24. The convex circular surfaces 34 and 35 of the sleeve 30 are inserted into the outer peripheral surface of the coupling balls 14 and 24 through O-rings 36 and 37. As mentioned above, the back cylindrical member 12 and the front cylindrical member 20 are coupled to each other to have a predetermined space in the front and back directions by the sleeve 30.

Moreover, the position of the front cylindrical member 20 can be changed to maintain parallel state to the axis of the back cylindrical member 12 or cross the axis in the operation range of the spherical rotation portions 15 and 25. Also, the front cylindrical member 20 and the back cylindrical member 12 are sealed by O rings 16, 26, 36, and 37, and the fluid passage 11 in the socket 10 is formed.

Reference numeral 38 is a hole for inserting tool therein and clamping in screwing auxiliary rings 32 and 38 to the sleeve 30.

Further, the back cylindrical member 12 of the socket 10 is fixed to a back support plate 50 by a bolt 51 in a state that the back cylindrical member 12 is inserted into a fixing hole formed in the back support plate 50. The front cylindrical member 20 is fixed to a front support plate 55 through a spring washer 58 for shock absorbing in a state that the front cylindrical member 20 is inserted into a fixing hole formed in the front support plate 55, which is parallel to the back support plate 50.

Coupling shafts 41 are formed with an equal distance to be parallel to the axis of the sleeve 30 in the four portions around the sleeve 30. In this case, in the back support plate 50, there is formed a through hole 50a where the back end portion of each coupling shaft 41 is inserted. Also, in the back end portion of each coupling shaft 41, there is formed a small diameter portion 41b, which is inserted into the coupling shaft 41. The small diameter portion 41b of the back end portion of the coupling shaft 41 extends to the outside portion through a through hole 50a. Moreover, a nut 42 is screwed to the extending end portion of the small diameter portion 41b and the extending end portion is fixed to the back support plate 50.

On the other hand, in the front support plate 55, there is formed a through hole 56 in which the front end portion of each coupling shaft 41 is inserted. In this case, a small diameter portion 41c is formed in the front end portion of each coupling shaft 41. On the small diameter portion 41c, substantially a cylindrical collar 43 is mounted to be movable in an axial direction. The outer diameter of the collar 43 is formed to be smaller than that of a through hole 56 of the front support plate 55. Then, in the front end portion of each coupling shaft 41, the collar 43 is loosely inserted into the through hole 56 of the front support plate 55. Moreover, in the back end portion of the collar 43, there is formed a flange 44 having a larger diameter than the diameter of the through hole 56.

Moreover, in the front end portion of the small diameter portion 41c of the coupling shaft 41, there is screwed a nut 46 through a spacer 45 formed in the front portion of the front support plate 55. The spacer 45 is formed to have the same diameter as that of the flange 44. The front support plate 55 is held by the flange 44 and the spacer 45, so that the front support plate 55 can be moved in the radial direction of the coupling shaft 41.

On the outer peripheral surface of the coupling shaft 41, a compression spring 47 is formed between the back surface of the flange 44 of the collar 43 and the front surface of the back support pate 50. The compression spring 47 generates spring force so as to spring the back support plate 50 and the front support plate 55 to be separated from each other. In a normal position, both support plates 50 and 55 are maintained to be parallel to each other. By the function of the compression spring 47, the front support plate 55 can be changed to be directed to the inclined state against the axis of the coupling shaft 41.

As mentioned above, the front support plate 55 is supported in the front end portion of the coupling shaft 41 in a free state. In this case, in the fixing portion of the collar 43 of the coupling shaft 41, there is formed a stepped portion 41a allowing the front support plate 55 to retreat. Therefore, the position of the front cylindrical member 20 can be freely changed in the axial direction.

A valve mechanism of the socket 10 will be explained.

A valve support cylinder 60 is fixed to the back portion of the inner peripheral surface of the front cylindrical member 20. The front end portion of the valve support cylinder 60 is brought into contact with a stepped portion 62 formed in the inner peripheral surface of the front cylindrical member 20. Moreover, the back end portion of the valve support cylinder 60 is engaged with the inner peripheral surface of the front cylindrical member 20 by a stop ring 63.

A valve support portion 60a is formed in the front portion of the support cylinder 60. In the valve support portion 60a, there are formed a valve support hole 66, which movably supports a valve rod 75 in the axial direction, and a plurality of fluid passages 67 around the hole 66. These fluid passages 67 are opened to a back space 65 of the valve support cylinder 60, which partially forms the fluid passage of the front cylindrical member 20.

Reference numeral 70 is a valve having a sealing ring 73 inserted into the front surface portion. The valve 70 comprises a main disc 71 on the valve rod 75, which is movably supported in the axial direction by the valve support cylinder 60, and an auxiliary disc 72. The main disc 71 and an auxiliary disc 72 hold the sealing ring 73 therebetween, and are tightened by nuts 74 and 77. Similar to the valve 70, a valve 80 on the side of the plug 8 is structured. Then, both nuts 74 are pressed to each other in their head portions at the time of connection of the socket 10 to the plug 8. 71a is an O-ring sealing between the main disc 71 and the valve rod 75. Reference numeral 78 is a valve spring for making the sealing ring 73 of the valve 70 contact a valve seat 79 formed to be projected from the inner periphery surface of the front cylindrical member 20.

On the other hand, the plug 8 is formed such that a predetermined insertion tolerance is provided between the outer peripheral surface of the top end portion and the inner peripheral surface of the front cylindrical member 20 of the socket 10 and the outer peripheral portion is sealed by the sealing ring 22. Reference numeral 81 is a valve spring, which springs the valve 80. If the plug 8 and the socket 10 are connected, the respective head portions 74 are pressed to each other and retreat, so that the fluid passage is released.

Next, the operation of the embodiment will be explained.

In a state that the socket 10 is separated from the plug 8, the back support plate 50 and the front support plate 55 are sprung by four compression coil springs 41, and maintained to be parallel to each other. The front cylindrical member 20 is positioned at the central portion of the region where the front cylindrical member 20 is movable against the ball 24.

At this time, if the axis of the front cylindrical member 20 of the socket 10 and that of the plug 8 are consistent with each other, the passage 11 of the socket 10 is connectable by the same function as the normal pipe joint having one cylindrical member.

Furthermore, if both axes, which are opposite to each other, are shifted in parallel in a state that the socket 10 and the plug 8 are separated from each other or both axes are crossed, the operation of connecting the plug 8 to the socket 10 is performed as follows.

First, in a case where the axis of the plug 8 and that of the socket 10 are crossed, the front cylindrical member 20 rotates around the spherical rotation portion 25 in accordance with the inclination of the axis of the plug 8 as the top end portion of the plug 8 is inserted into the front cylindrical member 20 of the socket 10.

At this time, the collar 43 is moved along the small diameter portion 41c of the coupling shaft 41 and the small diameter 41c of the coupling shaft 41 is radially moved together with the collar 43 in the through hole 56 of the front support plate 55. Thereby, the front support plate 55 can be moved in an axial direction against the coupling shaft 41 and a radial direction in accordance with the rotation of the front cylindrical member 20.

Therefore, even in a state that the axis of the plug 8 and that of the socket 10 are crossed, the plug 8 and the socket 10 can be connected to each other.

Moreover, in a case where both axes of the plug 8 and the socket 10 are shifted in parallel, the front cylindrical member 20 is moved until the axis of the front cylindrical member 20 is aligned with that of the plug 8 as the top end portion of the plug 8 is inserted into the front cylindrical member 20 of the socket 10. While the front cylindrical member 20 is moved, the front of the main cylinder 31 of the sleeve 30 and the front end portion rotate around the spherical rotation portions 15 and 25 and the main cylinder 31 of the sleeve 30 is inclined to the axial direction. Thereby, the front cylindrical member 20 is moved in parallel with the axis of the back cylindrical member 12.

At this time, the collar 43 is radially moved along the small diameter portion 41c of the coupling shaft 41 and the small diameter 41c of the coupling shaft 41 is radially moved together with the collar 43 in the through hole 56 of the front support plate 55. Thereby, the front support plate 55 can be moved in the axial direction against the coupling shaft 41 and the radial direction in accordance with the parallel movement of the front cylindrical member 20.

Therefore, even in a state that the axis of the plug 8 and that of the socket 10 are shifted in parallel, the plug 8 and the socket 10 can be connected to each other.

It is assumed that the number of sockets 10 are arranged in parallel and the number of plugs are connected to the sockets, respectively. In this case, if the axes of the paired socket 10 and the plug 8 are shifted and the arranging position thereof is also shifted in the axial direction, or the insertion of the plug 8 into the socket is stronger than the normal case, that is, the plug 8 is inserted into the socket additionally deeper, the plug 8 enters the front cylindrical member 20 of the socket 10. Then, in the drawing, even if the position at which the connection is completed is biased toward the left direction, the front cylindrical member 20 supported by the front support plate 55 retreats against spring force of the compression coil spring 47. Due to this, the position where the connection is completed is controlled, and the socket 10 and the plug 8 are connected to each other. At this time, since the front cylindrical member 20 retreats along the inner peripheral surface of the coupling ball 24 constituting the spherical rotation portion 25, the positional relationship between the sleeve 30 and the back cylindrical member 12 unchanges.

The above-mentioned embodiment showed the pipe joint comprising the socket 10 and the plug 8, which have no lock mechanism. However, it goes without saying that the present invention can be applied to the type of pipe joint having the lock mechanism.

Therefore, according to the present invention, the radial deflection of the pipe system can be absorbed. Also, since there is used the structure in which the outer peripheral portions of the front and back cylindrical members can be connected through the spherical coupling portion by the sleeve, the cause of narrowing the fluid passage having a small diameter ca be removed. This can contributes to miniaturize the structure, so that the cost of manufacture can be reduced.

Particularly, according to the above-mentioned embodiment, the moving direction of the socket or the plug is restricted, and this type of the pipe joint can be useful as a pipe joint having a large weight and a large diameter.

Moreover, the axes of the socket and the plug are mutually consistent with each other, and the shift of the axial direction can be absorbed. This structure is further useful to the type of the pipe joint in which the number of sockets and the plugs are connected at the same time.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A pipe joint apparatus, which includes first joint means having a socket, second joint means having a plug detachably connected to said socket, a connecting section for connecting a fixing pipe to one of first and second joint means, and a connecting section for connecting a non-fixing pipe to the other joint means, comprising:

a first cylindrical member arranged on the side of said connecting section for connecting said non-fixing pipe to said other joint means of first and second joint means, and connected to said other joint means to be detachable from said other joint means;

a second cylindrical member arranged in said one joint means to be spaced from said first cylindrical member and to be opposite to said first cylindrical member, and connected to said fixing pipe;

each of said first and second cylindrical members having spherical rotation portions;

sleeve means having opposite end portions coupled to outer peripheral surfaces of both first and second cylindrical members through the respective spherical rotation portions, and forming a fluid passage enclosing said outer peripheral surfaces of said first and second cylindrical members;

a first support member supporting said first cylindrical member;

a second support member spaced from and opposite to said first support member and supporting said second cylindrical member;

a plurality of coupling shafts disposed about said sleeve means and extending between said first and second support members;

fixing means for fixing each coupling shaft to one of first and second support members;

coupling means, providing in a coupling portion between said other support member and said coupling shaft, for coupling said first and second support members to be relatively freely deflected in a direction crossing at a right angle to the axial direction of said coupling shaft, said coupling means being formed in said support members, and said coupling shaft being inserted into a through hole having a hole diameter larger than the outer diameter of said coupling shaft, said coupling shaft comprising a collar having a flange whose diameter is larger than the hole diameter of said through hole, and a spacer holding said support member in which through hole is formed together with said flange;

a spring member between said first and second support members pressing said first and second support members in a direction away from each other, and applying spring force restricting the relative deflection between said coupling shaft and said first or second support member;

said spring member being formed of a compression coil spring, and said coupling shaft being inserted into the coil of said spring member; and a spring receiving portion of said spring member being formed of the flange of said collar.

2. The apparatus according to claim 1, wherein each of said spherical rotation portions comprises ring-shaped coupling balls, received about an outer peripheral surface of said first and second cylindrical members, respectively, each coupling ball having a convex circular surface formed in its outer peripheral surface, a concave circular surface corresponding to said convex circular surface being formed in said sleeve means.

3. The apparatus according to claim 2, wherein at least one coupling ball is coupled onto the outer peripheral surface of a corresponding cylindrical member for movement in an axial direction relative to said corresponding cylindrical member.

4. The apparatus according to claim 2, wherein said sleeve means has sealing material formed on a connecting surface between said first and second cylindrical members and said coupling balls, respectively, and connecting surfaces between the convex circular surfaces of said coupling balls and said concave circular surfaces of said sleeve means, said connecting surfaces being sealed by said sealing material.

5. The apparatus according to claim 1, wherein said first cylindrical member includes a fluid passage therethrough and a normally closed valve in said fluid passage for maintaining the fluid passage closed when said first and second joint means are not connected, and means for opening said fluid passage when said first and second joint means are connected.

* * * * *